United States Patent [19]

Ziems

[11] 4,155,417

[45] May 22, 1979

[54] SWITCH MECHANISM FOR THE AUTOMATIC STEERING SYSTEM OF AN AGRICULTURAL MACHINE

[75] Inventor: Horst Ziems, Harsewinkel, Fed. Rep. of Germany

[73] Assignee: Firma Gebr. Claas Maschinenfabrik GmbH, Harsewinkel, Fed. Rep. of Germany

[21] Appl. No.: 857,642

[22] Filed: Dec. 5, 1977

[30] Foreign Application Priority Data

Apr. 7, 1977 [DE] Fed. Rep. of Germany ....... 2715608

[51] Int. Cl.² .............................................. B62D 1/28
[52] U.S. Cl. ....................................... 180/98; 180/99; 200/61.85; 318/587
[58] Field of Search ...................... 180/98, 77 R, 82 R, 180/99; 318/587; 200/61.85

[56] References Cited

U.S. PATENT DOCUMENTS

| | | | |
|---|---|---|---|
| 3,222,639 | 12/1965 | Kayser | 180/99 X |
| 3,222,640 | 12/1965 | Wurst | 180/99 X |
| 3,392,799 | 7/1968 | Ishikawa | 180/109 X |
| 3,557,893 | 1/1971 | Kohls | 180/98 X |
| 4,042,058 | 8/1977 | Cooper | 180/98 |
| 4,077,486 | 3/1978 | Blakeslee | 180/98 X |

*Primary Examiner*—John P. Silverstrim
*Attorney, Agent, or Firm*—Pollock, Vande Sande & Priddy

[57] ABSTRACT

An agricultural machine of the type employing an automatic steering system is provided with separate switching devices for switching the steering system on and off. The mechanism for switching the system off is carried by the steering column of the machine and includes elements for monitoring the speed of manual rotation of the steering wheel to switch the automatic steering system off when the driver of the machine turns the steering wheel more rapidly than a predetermined speed of rotation. The mechanism for turning the automatic steering system on includes a pedal-operated switch which is covered by a displaceable housing, so that the automatic steering system can be turned on only by conscious effort of the driver. The on and off switching signals provided by these two mechanisms are coupled to an electronic switch forming a portion of the automatic steering system, and the switch-off signal normally predominates so that the preferred state of the system is its off condition.

9 Claims, 6 Drawing Figures

SWITCH MECHANISM FOR THE AUTOMATIC STEERING SYSTEM OF AN AGRICULTURAL MACHINE

BACKGROUND OF THE INVENTION

The present invention relates to agricultural machines such as harvesting machines or tractors, of the self-propelled automatic-steering type, and is more particularly concerned with switch mechanisms for turning the automatic steering system in such machines on and off.

Self-propelled agricultural machines provided with automatic steering have been suggested heretofore. Such machines are ordinarily provided with automatic guiding means having a sensing device operative to sense the plant rows, furrows, or other predetermined lines of reference. Such machines must also be provided with mechanisms for switching the automatic steering system off, so that the machine may be driven in a manual steering mode when desired or when necessary in the case of an emergency. Furthermore, the system should be so arranged that it is possible to switch the automatic steering on again, without excessive difficulty, when the machine is in motion. Known arrangements adapted to provide these types of operation include an operating switch which is normally situated at a convenient position near the driver's seat, so that the automatic steering system can be switched on and off as desired. This operating switch is often mounted on the steering column in the machine, directly below the steering wheel.

Arrangements of the type described above exhibit a number of disadvantages. For example, when the automatic steering system is off, it is entirely possible that it could be switched on inadvertently by accidental manipulation of the operating switch. Conversely, when the steering system is on and an emergency should arise which requires that it be turned off, the driver must effect a conscious manipulation of the operating switch which delays the immediate switching-off of the automatic steering system in a potentially dangerous situation. This latter disadvantage applies, moreover, when the system is of a different known type wherein an emergency switch, which may for example be combined with the steering wheel knob, is mounted directly on the vehicle steering wheel to switch the automatic steering system off in dangerous circumstances. The operation of such emergency switches also requires quick reaction on the part of the driver. As a result, the speed with which the automatic steering system is switched off will vary in dependence upon the reaction time and readiness of the driver in an emergency situation.

As a rule, when an emergency condition arises which necessitates deactivating the automatic steering system, the initial unconscious reaction of the driver is to attempt to effect a steering correction by manual operation of the agricultural machine, since it is normally possible to steer the machine manually even when the automatic steering system is in its on condition. In general, however, due to the very rapidly operating regulation of known automatic steering systems, it is impossible, even with fast rotation of the steering wheel, to completely override the automatic steering system. The automatic power assists which are employed in such systems are usually stronger and quicker in operation than a manual operation, and a manually-effected correction is therefore almost immediately reversed. The present invention, recognizing these factors, makes use of the normal initial reaction of the driver to achieve deactivation of the automatic steering system, so that the driver can indeed immediately override the automatic steering system in an emergency situation.

The primary object of the present invention is, accordingly, to provide a switching mechanism operative to switch off the automatic steering system on a self-propelled agricultural machine, and a cooperating separate switching mechanism for switching on the automatic power system when it is appropriate to do so, which mechanisms operate in physiologically and psychologically practical manners to achieve an immediate switching off of the system when necessary, and which further operate to prevent the steering system from being inadvertently switched on when it is in its off condition, thereby to eliminate operating mistakes in the switching on and off of the automatic steering system.

SUMMARY OF THE INVENTION

The foregoing object is accomplished in an agricultural machine of the general type described above, employing an automatic steering system having a main switch and a subsequent operating switch for the electrical elements of the automatic steering system, by utilizing, for the operating switch, a bistable electronic switch which is adapted to be switched on by means of a hand-operated or foot-operated switching mechanism and which is adapted to be switched off by a separate switching mechanism which is coupled to the steering shaft of the agricultural machine and which functions to measure the speed with which the steering column of the machine is rotated so as to provide a cut-out signal for the operating switch only when a preset threshold value of steering column rotational speed is exceeded.

The invention exhibits the particular advantages that in the event of danger, the anticipated unconscious reaction of the driver of the vehicle instantly cuts out the automatic steering system. More particularly, if the switching mechanism associated with the steering column of the machine detects a condition in which the steering wheel or its associated shaft has been rotated at a speed in excess of a predetermined speed, the automatic steering system is immediately switched to its off condition. It has been found in practice that it is suitable to set the mechanism so that a cut-out signal is generated whenever the steering wheel is turned through an angle of 30° within a predetermined time period; and the arrangement is such that this cut-out of the automatic steering system will occur independently of the direction in which the steering wheel is turned.

On the other hand, the mechanism employed to effect switching on of the automatic steering system is so arranged that the operator must resort to a conscious definite action to switch the system on whenever it is off, so that the switching on of the system cannot be accomplished by any manipulation of the steering wheel. Inadvertent reactivation of the automatic steering system is avoided by providing a separate switch for switching on the system, consisting of a foot switch which is spaced from the steering wheel, and which is normally covered by a hinged protective cover, preferably one provided with a strong return spring, so that a conscious effort on the part of the driver is required to gain access to and operate the foot switch. Advantages are also achieved by mounting the foot switch on a plate which has a raised side on the upper edge of which the lower edge of the protective cover is hingedly mounted.

In a particularly advantageous embodiment of the invention, the bistable operating switch takes the form of an electronic switch having two amplification stages, one adapted to receive and respond to a start signal generated by the aforementioned foot switch for switching on the automatic steering system, and the other arranged to receive and respond to a cut-out signal from the steering wheel switching mechanism for switching the automatic steering system off, the amplification stages and bistable operating switch being so arranged that, in the event that signals should be applied to both stages simultaneously, the cut-out signal predominates and the preferred condition of the steering system is its off condition. Whenever the agricultural machine is started, the operating switch assumes a position in which the automatic steering system is switched off. Moreover, in the event that the foot switch for switching the system on is stepped on simultaneously with actuation of the steering column controlled automatic cut-out means, the automatic steering system remains switched off.

The cut-out signal is created by the integration of impulses delivered by an impulse generator coupled to the steering wheel or its associated shaft. This impulse generator, taking the form of a rotary trigger mechanism, may include mechanical, magnetic, electrical or optical switching elements which are secured to the chassis of the machine, and which are responsive to rotating switch members which are coupled to and movable with the steering shaft. The impulses used to actuate the switching elements can be generated in a variety of ways. They may, for example, be mechanical impulses, e.g., a simple spring-loaded switch, actuated by a roller, can be arranged on the steering column with a cam wheel on the steering shaft, the arrangement being such that the cam wheel and its several nodes operates the actuating roller of the switch. Alternatively, the impulses for the cut-out signal can be generated optically or photoelectrically, e.g., by providing a stationary light beam which is associated with a slotted rotor element mounted for movement with the steering shaft of the vehicle.

In the preferred embodiment, the switching members take the form of magnet elements arranged in spaced relation to one another in a ring-shaped array, and arranged to provide magnetic fields of successively alternate polarity about said ring; and this ring-array of magnet elements is mounted for movement with the steering column relative to associated switch elements which are located at fixed positions adjacent the steering column and which preferably take the form of magnetically responsive reed switches. Since the life of such reed switches is almost unlimited, the overall system is free of wear, needs no servicing, is insensitive to dirt, and permits freedom of design, wherefore this preferred arrangement is particularly suited to the difficult conditions in which agricultural machines normally operate.

In an advantageous arrangement, the magnetic system consists of a magnet carrier in the form of a radial flange on the steering shaft, on which a plurality of bar magnets are arranged in parallel spaced relation to one another, with these bar magnets being adapted to operate two reed contact switches which are disposed in offset relation to one another adjacent the shaft. Suitably, eight such bar magnets are provided, spaced from one another at an angle of 45°; and the two reed switches are spaced from one another by an angle of 112.5°, so that an impulse is generated by the reed switches for each 22.5° angle of turn of the steering wheel. These impulses are preferably coupled to a converter which precedes the aforementioned amplification stage for the cut-out signal, the cut-out signal being formed by the integration of impulses in said converter. For example, the cut-out signal may be formed in the converter whenever the impulse frequency is more than 4 to 6 pulses per second.

The foregoing objects, advantages, construction and operation of the present invention will become more readily apparent from the following description and accompanying drawings wherein:

FIG. 1 schematically illustrates the driver's platform of a harvesting machine provided with the switching mechanisms of the present invention for switching the automatic steering system on and off;

DESCRIPTION OF THE PREFERRED EMBODIMENTS

Figure 1:
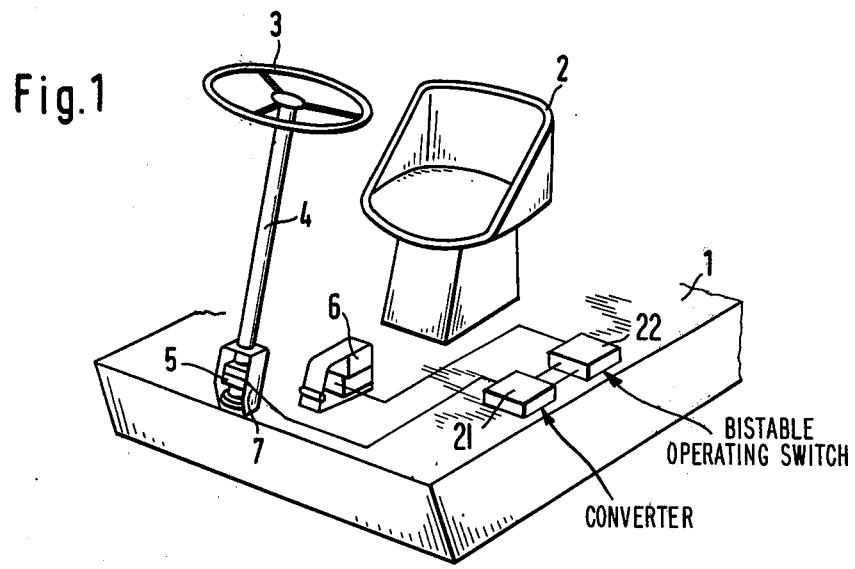
Figure 2:
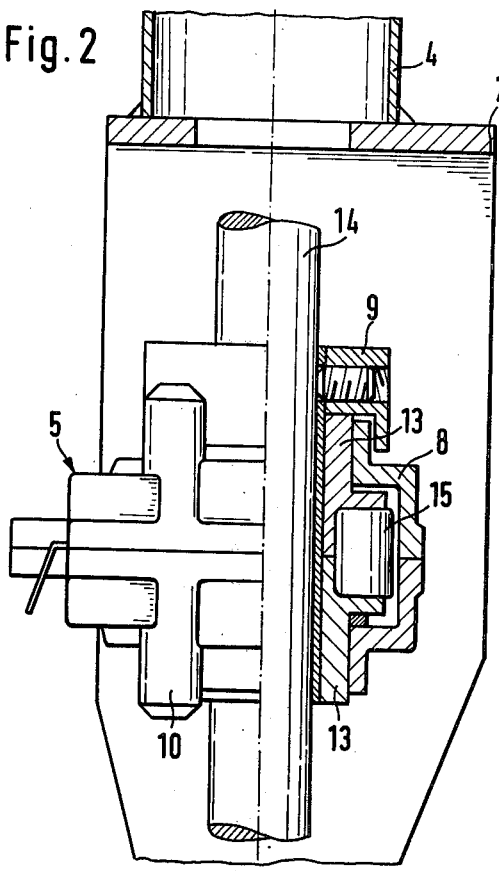
FIG. 2 is a partially sectioned side view of a rotary trigger device constructed in accordance with the present invention for switching off the automatic steering system.
Figure 3:
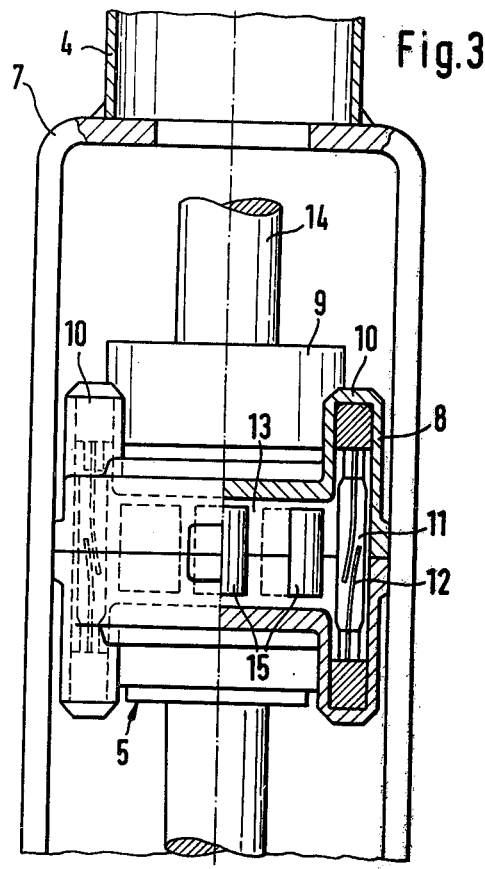
FIG. 3 is a partially sectioned end view of the rotary trigger of FIG. 2.
Figure 4:
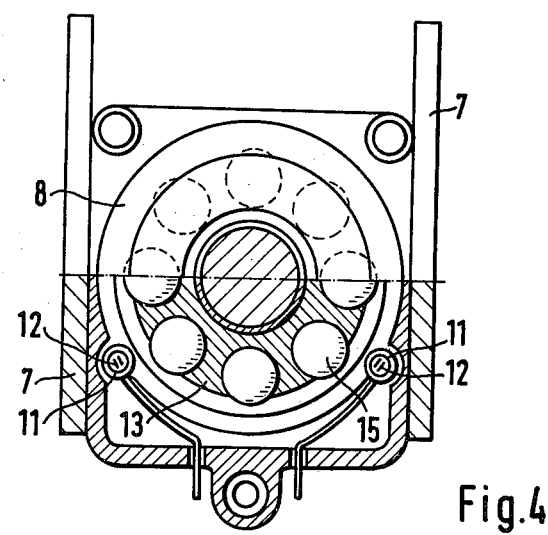
FIG. 4 is a partially sectioned plan view of the rotary trigger of FIG. 2.

Referrring initially to FIG. 1, the driver's platform 1 of a self-propelled agricultural machine, e.g., a harvesting machine such as a self-propelled combined harvester, or a tractor, is provided with a driver's seat 2 in front of which is located a steering wheel 3 mounted on a steering column 4. The rotary trigger 5, which will be more fully described by reference to FIGS. 2-4, is located within a frame 7 which encloses the rotary trigger at the lower end of the steering column 4. A foot switch 6 (which will be described more particularly with reference to FIGS. 5 and 6) is located on the platform next to the steering column 4, and this switch is normally covered by a safety cover 16 (e.g., see FIGS. 5 and 6) so that the foot switch 6 can be operated only after the safety cover 16 is opened by the driver of the machine.

The foot switch 6 is adapted to switch the automatic steering system on when desired (the automatic steering system itself is not illustrated in the drawings since it is conventional and can take any of many forms known to those skilled in the art). When the situation necessitates, the automatic steering system can be switched off again by rapid rotation of the steering wheel 3, the control mechanism being operative to evaluate the speed with which steering wheel 3 is manually rotated. Such manual operation of the steering wheel becomes necessary whenever the machine is being driven without automatic steering, or when conditions make it necessary to override the automatic steering system. In the latter case, the driver will, without thinking, turn the steering wheel 3 faster than occurs in a normal automatic driving situation whereby, in accordance with the present invention, the automatic steering system will be switched off. The automatic steering system can thereafter be reactivated only by the driver consciously exposing the foot switch 6 to permit it to be foot-operated.

The means which are employed to monitor the rotational speed of the steering wheel 3 comprises a rotary trigger 5 which produces impulses as the steering wheel 3 or its associated shaft is rotated, and these impulses are coupled to a converter 21 which functions to produce a cut-out signal operative, after amplification, to deactivate the automatic steering system whenever a suitable predetermined threshold value of the rotational speed of the steering wheel has been exceeded. The automatic steering switch which responds to this signal preferably comprises a bistable electronic switch 22, the on state of which is controlled by means of the foot switch 6, whereas switch-over to its off state is effected by means of the aforementioned cut-out signal. For this purpose, the bistable operating switch 22 is provided with two amplification stages, one adapted to receive an on signal from the foot switch 6, and the other of which is arranged to receive the cut-out signal from the converter 21 and its associated rotary trigger 5.

Since this circuit arrangement employs only conventional elements and conventional amplification stages, the circuit has not been illustrated in detail in the drawings. In practice, however, the aforementioned converter is operative to generate a cut-out signal by the integration of impulses from the rotary trigger 5 whenever the steering shaft has been turned through a rotary angle of 20°-30° with a speed sufficient to produce an impulse frequency of more than 4 to 6 pulses per second. In addition, the circuit arrangement is preferably such that the cut-out signal which is produced by action of the rotary trigger 5 is given precedence over any on signal which is generated by depression of foot switch 6, so that if the foot switch 6 should be actuated at the same time that the threshold value of the rotational speed of the steering wheel 3 is being exceeded, the off state of the operating switch of the automatic steering system dominates. The preferred state of the operating switch is its off condition so that, whenever the agricultural machine is started, the automatic steering system on the machine is initially not switched on. Various circuits functioning in the manner described can be readily provided by those skilled in the art.

The rotary trigger 5, which is used in the production of the cut-out signal, operates to produce electrical or mechanical impulses which are counted in the amplification stage of the operating switch. In the particular embodiment shown in FIGS. 2-4, such impulses are produced by the successive opening and closing of reed switch contacts due to movement of magnet elements adjacent to the reed switches.

Referring to FIGS. 2-4, the steering column 4 is provided, at its lower end, with a U-shaped frame 7 which encloses a housing 8 for the rotary trigger 5. The rotary trigger housing 8 (see in particular FIG. 2) consists of two symmetrical combined shells provided with a cap 9 at their upper ends. The housing 8 supports two cylinders 10 which are spaced from one another by an angle of 112.5°, and each cylinder 10 contains a tubular glass envelope 11 having magnetically responsive reed contacts 12 therein. The reed contacts 12, like the housing 8, are fixed in position by means of U-shaped frame 7 adjacent to the steering column 4; and these reed contacts 12 are located on a circular path which is closely adjacent to and concentric with a circular array of magnets 15 which are mounted on a rotor 13 coupled to the steering shaft 14 for movement therewith.

As best shown in FIG. 2, the rotor 13 is provided with two radially extending flanges between which the magnets 15 are situated. The magnets are preferably cylindrical bar magnets, as shown in FIGS. 2 and 3; and the magnets are mounted in alternately opposing polarities. Each magnet is provided with a small radial overhang (see FIGS. 2 and 4) relative to rotor 13 so that they may pass closely adjacent to the reed contacts 12. The magnets 15 on the rotor 13 are spaced from one another by an angle of 45° and, moreover, since the magnets 15 are drawn past the reed contacts 12 with alternating polarity, the contacts 12 are open momentarily one at a time as the rotor 13 is turned so that, as a result of the alternating polarity of the magnets 15, the magnetic flux through the contacts 12 is regularly reversed. This process takes place equally in each of the two reed contact pairs 12, which are in turn so offset relative to one another that a half spacing of the magnets 15 on the rotor 13 produces displaced phase impulses. Thus, for each 22.5° turn of the steering wheel 3, an impulse is generated for evaluation in the amplification stage of the operating switch. As mentioned previously, the circuit is preferably so arranged that a cut-out signal is formed whenever the impulse frequency exceeds 4 to 6 pulses per second.

The rotary trigger 5, which is used to produce impulses in dependence on the angle and speed of rotation of the steering wheel, can take other forms. Instead of using reed contacts 12 (or other forms of magnetic-mechanical switch elements), the switch elements employed can be electromagnetic or optical elements. When these alternative forms of switch elements are employed, they can be associated with other appropriately constructed rotating switch members, i.e., the bar magnets 15 can be replaced by electrical coils, or by a light source associated with suitable apertures. It is also possible to use a purely mechanical arrangement comprising a spring-loaded switch and an actuating roller mounted on the steering column 4, and an associated rotary cam wheel having nodes mounted on the steering shaft.

Figure 5:
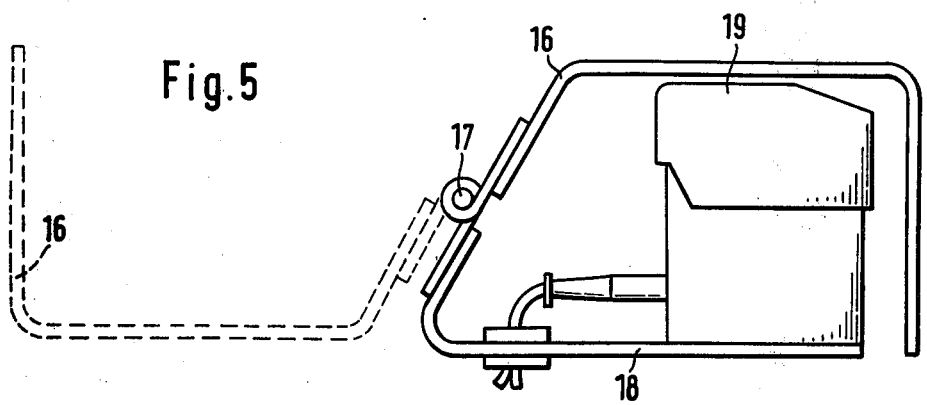
FIG. 5 is a side view of the pedal-switch mechanism used to switch on the automatic steering system in accordance with the present invention.
Figure 6:
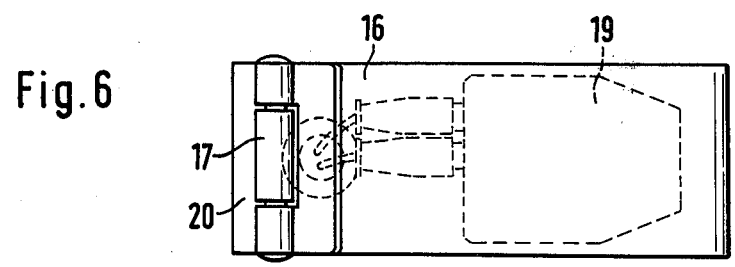
FIG. 6 is a plan view of the switch mechanism shown in FIG. 5.

FIGS. 5 and 6 show a preferred embodiment of the foot switch 6 which is employed to switch the automatic steering system on when it has been switched off. Switch 6 is so arranged that it cannot be unintentionally switched on. More particularly, the switch 6 and its associated pedal button 19 is situated under a hinged protective cover 16 which completely covers button 19 when the cover is in its closed position. Switch 6 is mounted on a base plate 18 which has a raised side 20 to which the protective cover 16 is attached by means of a hinge 17. It is advantageous to include a strong return spring between base plate 18 and cover 16, e.g., in the region of hinge 17, which operates to bias cover 16 toward its closed position, so that the driver of the vehicle must make a conscious effort to open cover 16 before he can gain access to pedal button 19.

The open position of the protective cover 16 is indicated by broken lines in FIG. 5. The generally U-shaped design of the protective cover 16, and the dimensioning of the shorter side thereof which cooperates with the raised side 20 of base plate 18 at hinge 17, permits a hinged movement of the protective cover through about 180°. In its closed position, the free edge of the protective cover 16 is coplanar with base plate 18 so that said free edge rests directly on platform 1. When the protective cover is in its open position, these same dimensional considerations cause the back of the protective cover 16 to lie on the platform 1. The protective cover 16 is closed, and actuation of the button 19 thus prevented, when the machine is being driven with the automatic steering system switched off and when inadvertent activation of the automatic steering system is to be effectively prevented. Moreover, the protective cover 16 is also preferably maintained closed when the machine is being driven with the automatic steering system switched on, so that if the automatic steering system should be switched to its off condition due to operation of trigger 5 as described previously, the driver cannot restore the automatic steering system to its on condition until he consciously opens the protective cover cover 16 and actuates button 19 of foot switch 6.

Having thus described my invention, I claim:

1. In a self-propelled agricultural machine of the type comprising a platform for a driver of the machine, a steering wheel on said platform, and an automatic steering system in said machine which includes switch means operable by the driver of the machine for switching the automatic steering system on and off, the improvement comprising a first switching mechanism adapted to be operated by the driver of the machine for actuating said switch means to switch said automatic steering system on, and a second switching mechanism physically spaced from said first switching mechanism and adapted to be operated by the driver of the machine independently of the operation of said first switching mechanism for actuating said switch means to switch said automatic steering system off, said second switching mechanism including measuring means coupled to said steering wheel for monitoring the rate of speed with which said steering wheel is manually turned by the driver of the machine when said automatic steering system is on to switch off said automatic steering system in response to manual rotation of said steering wheel at a speed in excess of a predetermined speed as a result of the driver's attempt to manually override the automatic steering system in psychological reaction to a dangerous situation.

2. The improvement of claim 1 wherein said measuring means comprises a trigger generator coupled to said steering wheel for producing a plurality of impulses at a repetition rate related to the speed of rotation of said steering wheel, and means responsive to said plurality of impulses for generating a cut-off signal operative to deactivate said automatic steering system when said steering wheel is turned through a rotary angle of between 20° and 30° at a speed sufficient to produce said impulses at a repetition rate in excess of substantially 4 to 6 impulses per second.

3. The improvement of claim 1 wherein said measuring means includes a plurality of switch members mounted for rotation with rotation of said steering wheel, and a plurality of switch elements fixed at spaced positions adjacent the path of circular movement of said switch members and operable to produce a plurality of impulses at a repetition rate related to the speed of rotation of said steering wheel.

4. The improvement of claim 3 wherein said switch members comprise a plurality of permanent magnets, said switch elements comprising a plurality of magnetically responsive reed switches.

5. The improvement of claim 4 wherein said steering wheel is coupled to a steering shaft, said permanent magnets comprising elongated bar magnets disposed in parallel relation to one another and to said steering shaft, with respective alternating magnetic polarities, on a support structure which is connected to and rotatable with said steering shaft.

6. The improvement of claim 5 wherein said bar magnets constitute eight bar magnets spaced from one another on said support structure by 45° intervals.

7. The improvement of claim 6 wherein said reed switches constitute two reed switches spaced from one another by substantially 112.5°.

8. The improvement of claim 1 wherein said first switching mechanism comprises a foot-operable switch mounted on said platform, and a protective cover overlying said foot-operable switch for normally rendering said switch inaccessible to the driver of the machine.

9. The improvement of claim 8 wherein said foot-operable switch is disposed on a mounting plate having an upwardly extending side member, said protective cover being hingedly connected at a lower edge thereof to the upper edge of said side member.

* * * * *